US012309690B2

(12) United States Patent
Yu

(10) Patent No.: US 12,309,690 B2
(45) Date of Patent: May 20, 2025

(54) NETWORK SLICE DETERMINATION METHOD AND RELATED APPARATUS

(71) Applicant: Tencent Technology (Shenzhen) Company Limited, Shenzhen (CN)

(72) Inventor: Yifan Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 458 days.

(21) Appl. No.: 17/697,645

(22) Filed: Mar. 17, 2022

(65) Prior Publication Data
US 2022/0210729 A1   Jun. 30, 2022

Related U.S. Application Data

(63) Continuation of application No. PCT/CN2021/074965, filed on Feb. 3, 2021.

(30) Foreign Application Priority Data

Mar. 26, 2020 (CN) .......................... 202010223238.6

(51) Int. Cl.
H04W 48/18 (2009.01)
H04W 28/02 (2009.01)
(Continued)

(52) U.S. Cl.
CPC ....... *H04W 48/18* (2013.01); *H04W 28/0268* (2013.01); *H04W 40/12* (2013.01); *H04W 76/12* (2018.02)

(58) Field of Classification Search
CPC . H04W 48/18; H04W 40/12; H04W 28/0268; H04W 28/0568; H04W 76/12
See application file for complete search history.

(56) References Cited

U.S. PATENT DOCUMENTS

2019/0053104 A1    2/2019  Qiao et al.
2019/0053147 A1*   2/2019  Qiao ..................... H04W 48/18
(Continued)

FOREIGN PATENT DOCUMENTS

CN    107105458 A    8/2017
CN    107889169 A    4/2018
(Continued)

OTHER PUBLICATIONS

International Search Report and Written Opinion for International Application No. PCT/CN2021/074965 mailed May 8, 2021 including translation of International Search Report (13 pages).
(Continued)

*Primary Examiner* — Jinsong Hu
*Assistant Examiner* — Farideh Madani
(74) *Attorney, Agent, or Firm* — Crowell & Moring LLP

(57) ABSTRACT

Embodiments of this application disclose a network slice (NSL) determination method. Based on the method, a service server may actively initiate a slice establishment request in response to determining a service requirement for establishing an NSL, the slice establishment request including a service quality parameter supporting the service requirement. A terminal may acquire a first device trigger request corresponding to the slice establishment request, and determine a corresponding slice configuration identifier (ID) according to the service quality parameter in the first device trigger request, the slice configuration ID being capable of reflecting a configuration parameter of an NSL capable of supporting the service quality parameter. The terminal initiates a data path establishment request for the service server according to the slice configuration ID to complete the establishment of an NSL and a data path in the NSL in a 5th generation mobile (5G) network.

20 Claims, 8 Drawing Sheets

(51) Int. Cl.
*H04W 40/12* (2009.01)
*H04W 76/12* (2018.01)

(56) References Cited

U.S. PATENT DOCUMENTS

2019/0098545 A1* 3/2019 Zhang ................... H04W 36/00
2020/0177678 A1* 6/2020 Livanos .............. H04L 41/0895
2020/0236594 A1* 7/2020 Tang ..................... H04W 28/24
2021/0152615 A1* 5/2021 Karampatsis ....... H04L 65/1016

FOREIGN PATENT DOCUMENTS

| CN | 109391648 A | 2/2019 | | |
|---|---|---|---|---|
| CN | 106713406 B | 1/2020 | | |
| CN | 111416745 A | 7/2020 | | |
| WO | WO 2018/059268 A1 | 4/2018 | | |
| WO | WO-2018232241 A1 * | 12/2018 | ............ | H04W 76/10 |

OTHER PUBLICATIONS

Extended European Search Report for Application No. 21776720.1 dated Oct. 27, 2022 (9 pages).

* cited by examiner

NETWORK SLICE DETERMINATION METHOD AND RELATED APPARATUS

RELATED APPLICATION

This application is a continuation of International Patent Application No. PCT/CN2021/074965, filed Feb. 3, 2021, which claims priority to Chinese Patent Application No. 202010223238.6, entitled "NETWORK SLICE DETERMINATION METHOD AND RELATED APPARATUS" and filed with the China National Intellectual Property Administration on Mar. 26, 2020. The contents of International Patent Application No. PCT/CN2021/074965 and Chinese Patent Application No. 202010223238.6 are each incorporated herein by reference in their entirety.

FIELD OF THE TECHNOLOGY

This application relates to the field of communications, and particularly to the determination of network slices (NSLs).

BACKGROUND OF THE DISCLOSURE

NSL will be important technical means for meeting special service requirements of different industries in 5th generation mobile (5G) networks. An NSL is a communication resource capable of ensuring that a bearer service may meet a service level requirement (SLR). For example, in some scenarios, network service quality of a protocol data unit (PDU) session between user equipment (UE) and a server may be supported through an established NSL.

Currently, in an NSL architecture supported by the 3rd generation partnership project (3GPP), when there is a need to establish an NSL, the establishment of the NSL is usually initiated by an application (APP) installed in UE, and the APP is required to have an APP identifier (ID) allocated by applying to a 5G operator.

In this manner, many currently used APPs can support the foregoing NSL establishment function only after architecturally upgraded or even re-developed, and it is necessary to additionally apply to the operator for IDs. As a result, the adaptation costs are greatly increased.

SUMMARY

In order to solve the foregoing technical problem, this application provides an NSL determination method, so that a terminal can complete the establishment of an NSL under an original APP system architecture without initiating a slice establishment request, which reduces difficulties in APP adaptation and the human costs.

Embodiments of this application disclose the following technical solutions:

According to an aspect, an embodiment of this application provides an NSL determination method, including:

acquiring a first device trigger request, the first device trigger request including a service quality parameter carried in a slice establishment request initiated by a service server;

determining a corresponding slice configuration ID according to the service quality parameter, the slice configuration ID being used for identifying a configuration parameter of an NSL supporting the service quality parameter;

initiating a data path establishment request for the service server according to the slice configuration ID;

acquiring an establishment complete message returned for the data path establishment request, the establishment complete message being used for identifying that an established data path has been imported into an established target NSL, and the target NSL being established according to the slice configuration ID; and returning a first device trigger response including an ID of the data path for the first device trigger request, the first device trigger response being used for identifying that the target NSL is established.

In a possible implementation, in event that a UE route selection policy (URSP) record corresponding to the service server is established, the method further includes:

deleting the URSP record.

According to another aspect, an embodiment of this application provides an NSL determination apparatus, including a first acquisition unit, a first determination unit, a first initiation unit, a second acquisition unit, and a first returning unit.

The first acquisition unit is configured to acquire a first device trigger request, the first device trigger request including a service quality parameter carried in a slice establishment request initiated by a service server.

The first determination unit is configured to determine a corresponding slice configuration ID according to the service quality parameter, the slice configuration ID being used for identifying a configuration parameter of an NSL supporting the service quality parameter.

The first initiation unit is configured to initiate a data path establishment request for the service server according to the slice configuration ID.

The second acquisition unit is configured to acquire an establishment complete message returned for the data path establishment request, the establishment complete message being used for identifying that an established data path has been imported into an established target NSL, and the target NSL being established according to the slice configuration ID.

The first returning unit is configured to return a first device trigger response including an ID of the data path for the first device trigger request, the first device trigger response being used for identifying that the target NSL is established.

According to another aspect, an embodiment of this application provides an NSL determination method, including:

initiating a slice establishment request, the slice establishment request including a service quality parameter and an ID of UE, and the slice establishment request being used for instructing the UE to initiate a data path establishment request for a service server based on the service quality parameter; and acquiring a slice establishment response including an ID of a data path, the slice establishment response being used for identifying that a target NSL corresponding to a slice configuration ID is established, and the data path between the UE and the service server has been imported into the target NSL.

In a possible implementation, the method further includes:

initiating a slice closing request including the ID of the data path, the slice closing request being used for instructing the UE to release the data path to close the target NSL; and acquiring a slice closing response, the slice closing response being used for identifying that the target NSL is closed.

In a possible implementation, in event that a correspondence is established, the method further includes:

deleting the correspondence.

According to another aspect, an embodiment of this application provides an NSL determination apparatus, including a first initiation unit and a first acquisition unit.

The first initiation unit is configured to initiate a slice establishment request, the slice establishment request including a service quality parameter and an ID of UE, and the slice establishment request being used for instructing the UE to initiate a data path establishment request for a service server based on the service quality parameter.

The first acquisition unit is configured to acquire a slice establishment response including an ID of a data path, the slice establishment response being used for identifying that a target NSL corresponding to a slice configuration ID is established, and the data path between the UE and the service server has been imported into the target NSL.

According to another aspect, an embodiment of this application provides an NSL determination system, including UE and a service server.

The UE is configured to perform the NSL determination method as described in the foregoing an aspect.

The service server is configured to perform the NSL determination method as described in the foregoing another aspect.

According to another aspect, an embodiment of this application provides an NSL determination device, including a processor and a memory.

The memory is configured to store program code and transmit the program code to the processor.

The processor is configured to perform the NSL determination methods as described in the foregoing aspects according to instructions in the program code.

According to another aspect, an embodiment of this application provides a computer-readable storage medium, configured to store a computer program for performing the NSL determination methods as described in the foregoing aspects.

It can be seen from the foregoing technical solutions that the service server may actively initiate a slice establishment request in response to determining a service requirement for establishing an NSL, the slice establishment request including a service quality parameter supporting the service requirement. Correspondingly, the terminal may acquire a first device trigger request corresponding to the slice establishment request, and determine a corresponding slice configuration ID according to the service quality parameter in the first device trigger request, the slice configuration ID being capable of reflecting a configuration parameter of an NSL capable of supporting the service quality parameter. The terminal initiates a data path establishment request for the service server according to the slice configuration ID, the data path establishment request being capable of instructing a 5G network to establish a data path between the terminal and the service server in an established NSL supporting the service quality parameter. The terminal returns, in response to confirming that the data path is established, a first device trigger response including an ID of the data path so as to notify the service server that the NSL is established. It can be seen therefrom that, when there is a need to establish an NSL between the terminal and the service server, the service server may serve as an initiator of a slice establishment request. An APP deployed in the terminal only needs to make a request of establishing a corresponding data path after the service server initiates the request, without being architecturally upgraded to transmit dedicated network signaling so as to initiate the slice establishment request, and may be matched with the service server to implement the establishment of the NSL under an original APP system architecture so as to meet a service requirement in the 5G network. Moreover, there is no need to apply for a specific APP ID, so that the adaptation costs for accessing the 5G network are greatly reduced.

BRIEF DESCRIPTION OF THE DRAWINGS

To describe the technical solutions in the embodiments of this application or the related art more clearly, the following briefly describes the accompanying drawings required for describing the embodiments or the related art. Apparently, the accompanying drawings in the following description show merely some embodiments of this application, and a person of ordinary skill in the art may still derive other drawings from the accompanying drawings without creative efforts.

DESCRIPTION OF EMBODIMENTS

The following describes the embodiments of this application with reference to the accompanying drawings.

In a related technology of a 5G network, only an APP in 5G UE may initiate a request of establishing an NSL. As a result, many currently used APPs can support the foregoing NSL establishment function only after architecturally upgraded or even re-developed, and need to additionally have APP IDs allocated by a 5G network operator. The establishment conditions are strict.

Figure 1:
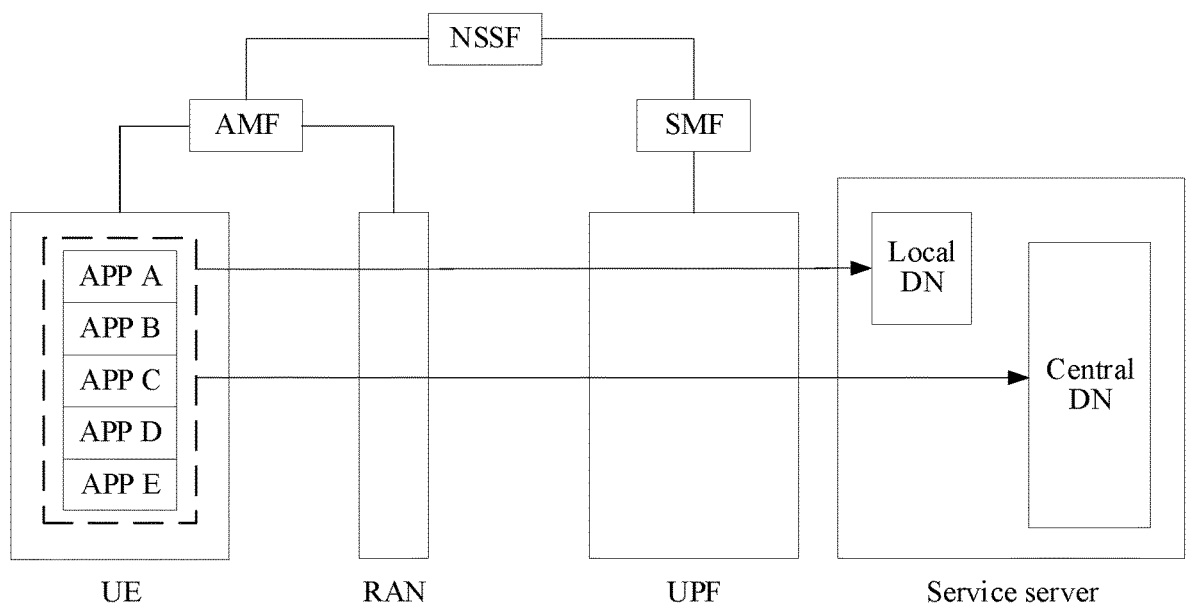
FIG. 1 is a schematic diagram of an NSL determination method according to a related art.

As shown in FIG. 1, FIG. 1 is a schematic diagram of an NSL establishment method according to a related art. In the schematic diagram, there are a plurality of APPs in UE. An APP in need of initiating an NSL may initiate a slice establishment request to a network slice selection function (NSSF) module, and the NSSF module establishes the NSL in a 5G network. The NSL may be used for connecting the APP in the UE and a service server in a local data network (DN) module or a central DN module. The APP capable of initiating the request is required to have an APP ID allocated by a 5G network operator.

An APP is required to have an APP ID during the initiation of a slice establishment request, and also needs to be capable of supporting 5G network signaling. Therefore, in order to enable the APP to initiate the establishment of an NSL and adapt to the 5G network, a developer needs to apply for the APP ID for the APP, and even needs to architecturally upgrade the APP. It is relatively difficult to implement adaptation.

In order to solve the foregoing technical problem, this application provides an NSL determination method. Based on the method, when there is a need to establish an NSL, a service server may initiate a request of establishing the NSL. A terminal only needs to initiate a data path establishment request in response to the request to complete the establishment of the NSL and a data path in the NSL in a 5G network. Therefore, the terminal can complete the establishment of an NSL under an original APP system architecture without initiating a slice establishment request, which reduces difficulties in APP adaptation and the human costs.

It may be understood that the method may be applied to a processing device capable of processing NSL related information, such as UE or a service server with a function of processing NSL related information. The method may be applied to a network scenario that UE communicates with a service server, and is performed cooperatively by the UE and the service server. The UE may be a computer, a personal digital assistant (PDA), a tablet computer or the like. The service server may be an application server, or may be a Web server. During actual deployment, the service server may be an independent server, or may be a cluster server. In addition, in terms of hardware environment, environments capable of being implemented by the technology include an advanced reduced instruction-set computer (RISC) machine (ARM) architecture processor and an X86 architecture processor. In terms of software environment, environments capable of being implemented by the technology include an Android platform, Windows xp and operating systems above, or a Linux operating system.

For easier understanding of the technical solutions of this application, the NSL determination method provided in this embodiment of this application is described below in combination with practical application scenarios.

Figure 2:
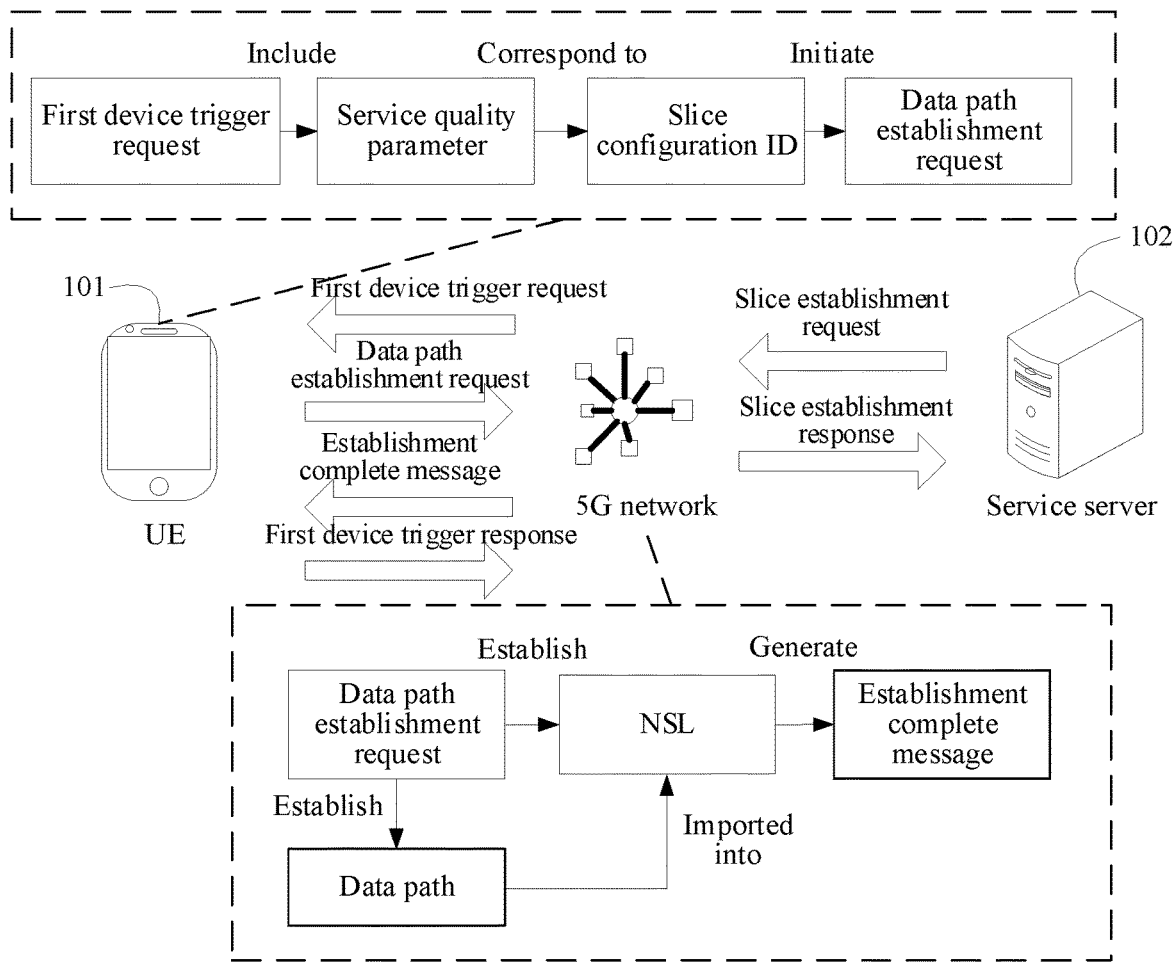
FIG. 2 is a schematic diagram of an NSL determination method in a practical application scenario according to an embodiment of this application.
Figure 3:
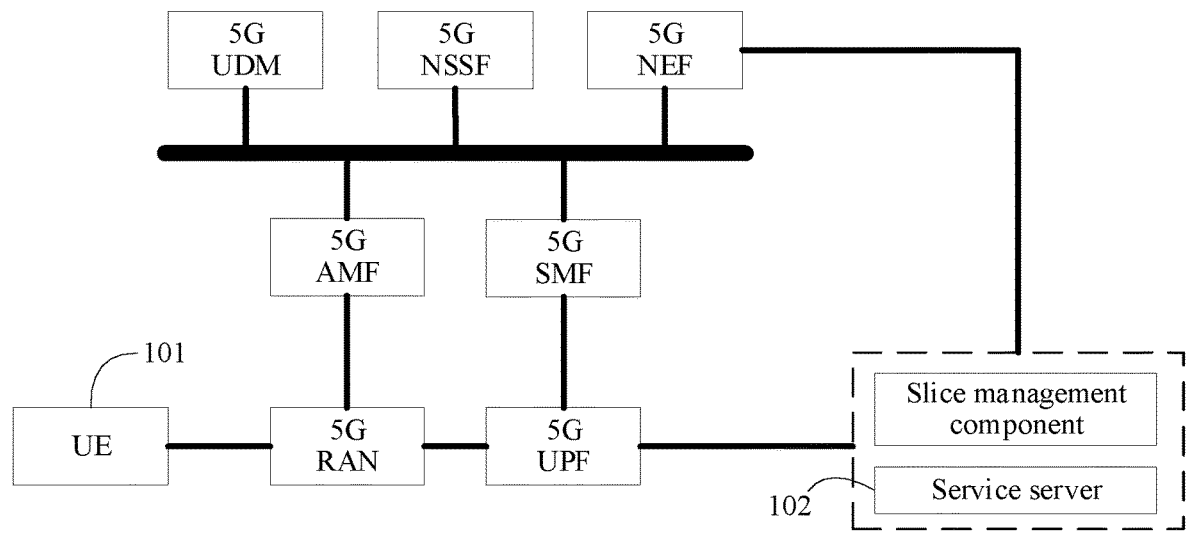
FIG. 3 is a schematic diagram of a system architecture for determining an NSL according to an embodiment of this application.

Referring to FIG. 2, FIG. 2 is a schematic diagram of a practical application scenario of an NSL determination method according to an embodiment of this application. In the application scenario, UE 101 and a service server 102 are processing devices. An APP in the UE 101 may have various service processing requirements during service processing. Some of the service processing requirements may highly require the security, reliability and transmission rate of service data transmission. In this case, a corresponding NSL may be established for data transmission between the UE 101 and the service server 102 by use of an NSL technology in a 5G network borne by a 5G network base station. As shown in FIG. 3, FIG. 3 is a schematic diagram of a system architecture of a 5G network borne by a base station. The NSL determination method provided in the technical solution of this application may be completed in the system architecture. In addition to the UE 101 and the service server 102, a 5G NSSF module, a 5G network exposure function (NEF) module, a 5G user plane function (UPF) module, a radio access network (RAN) module, a 5G unified data management (UDM) module, a 5G access and mobility management function (AMF) module, and a 5G session management function (SMF) module are further included. When it is determined that an NSL needs to be established for data transmission, the service server 102 may initiate a slice establishment request and transmit the slice establishment request to the 5G network. In order to enable the established NSL to meet a service processing requirement, the service server 102 may add a service quality parameter to the initiated slice establishment request, the service quality parameter being used for identifying a parameter requirement required by this service processing. In addition, in order to enable the 5G network to determine UE in need of performing this data transmission, the slice establishment request further includes an ID of the UE 101.

After receiving the slice establishment request, the 5G network may convert the slice establishment request into a first device trigger request that the UE 101 can receive and respond to, the first device trigger request including a service quality parameter in the slice establishment request. The 5G network may transmit the first device trigger request to the UE 101 according to the ID of the UE 101. After acquiring the first device trigger request, the UE 101 may determine a corresponding slice configuration ID according to the service quality parameter therein. The slice configuration ID is used for identifying a configuration parameter of an NSL supporting the service quality parameter. In the 5G network, a corresponding NSL may be established according to the configuration parameter.

It may be understood that the NSL provides a resource for data transmission. In order to perform data transmission between the UE 101 and the service server 102, a data path for connecting the UE 101 and the service server 102 needs to be established in the NSL. Therefore, after determining the slice configuration ID, the UE 101 may initiate a data path establishment request for the service server 102 to the 5G network according to the slice configuration ID.

After receiving the data path establishment request, the 5G network may establish a target NSL supporting the service quality parameter according to the slice configuration ID in the data path establishment request, the target NSL being used for providing a network resource needed by the data transmission between the UE 101 and the service server 102. In order to implement the data transmission between the UE 101 and the service server 102, after completing the establishment, the 5G network further needs to establish a data path for the service server 102 according to the request and import the data path into the established target NSL. Therefore, data transmission between the UE 101 and the service server 102 may be performed through the data path in the target NSL capable of supporting data transmission.

After completing importing, the 5G network may return an establishment complete message to the UE 101 to notify the UE 101 that the target NSL and the data path have been established and that the data path has been imported into the target NSL. In this case, in order to notify the service server 102 of the establishment complete message, the UE 101 may return a first device trigger response including an ID of the data path for the first device trigger request. After receiving the first device trigger response, the 5G network may return a slice establishment response including the ID of the data path to the service server 102 to notify the service server 102 that the NSL has been established.

It can be seen therefrom that, in the application scenario of this application, when there is a need to establish an NSL for data transmission, the service server 102 may initiate a slice establishment request. The UE 101 only needs to initiate a corresponding data path establishment request in response to the slice establishment request to complete the establishment of a target NSL and a data path needed by data transmission in the 5G network. The data path may be imported into the target NSL for data transmission. Therefore, the UE 101 does not need to initiate a slice establishment request, so that there is no need to upgrade or even re-develop an APP architecture in the UE 101 and acquire an APP ID required by initiating the slice establishment request. Therefore, difficulties in NSL establishment are reduced to a certain extent, and the adaptation costs for the access of the APP in the UE 101 to the 5G network are reduced.

Figure 4:
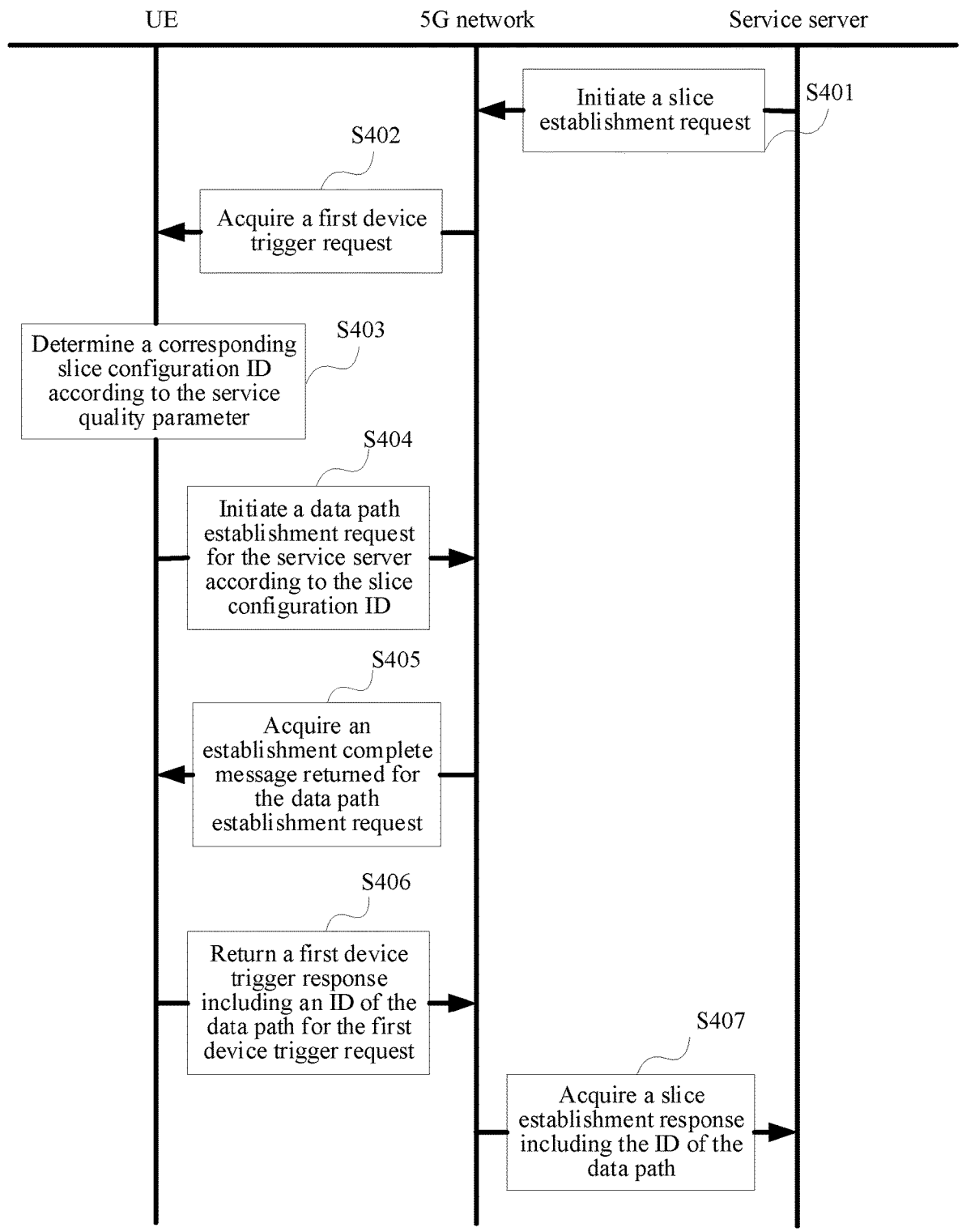
FIG. 4 is a signaling diagram of an NSL determination method according to an embodiment of this application.

A network slice determination method provided in an embodiment of this application is described below in detail with reference to the accompanying drawings. Referring to FIG. 4, FIG. 4 is a signaling diagram of an NSL determination method. The method includes the following steps:

S401. A service server initiates a slice establishment request.

With the continuous development of UE, various APPs in UE have become an indispensable part of people's daily life. For example, people often watch TV series, movies, and other entertainment videos through various film and television APPs in leisure time, or transmit and share files through some network disk APPs. In a 5G technology, in order to meet data transmission requirements of different APPs, corresponding NSLs may be established, when needed, for various APPs according to slice establishment requests initiated by the APPs for the APPs to perform data transmission.

For example, in the schematic diagram shown in FIG. 1, APP C with an NSL establishment requirement in the UE may transmit a slice establishment request to the NSSF module through the AMF module. After receiving the request, the NSSF module notifies the RAN module and UPF module in the 5G base station of reserving resources respectively through the AMF module and the SMF module, the resources being used for establishing an NSL. Confirmation information about an NSL establishment success may be notified to APP C after the NSL is established. APP C may initiate a PDU session request. The 5G network may establish a PDU session between APP C and the central DN according to the request, and allocate the PDU session to the established NSL. Therefore, APP C in the UE may perform data transmission with the service server in the central DN through the session. For example, transmitted data may be transmitted from APP C in the UE and forwarded to the service server in the central DN through the RAN and UPF modules.

However, in the related art, during the initiation of a slice establishment request, an APP needs to acquire an APP ID allocated by an operator, and also needs to support 5G network signaling. Therefore, when an APP needs to initiate a slice establishment request, it is necessary to apply for a corresponding APP ID and architecturally upgrade the APP. As a result, the costs are relatively high.

In order to reduce the costs of establishing an NSL, in the technical solution provided in this embodiment of this application, a slice establishment request may be initiated by the service server. Therefore, the initiation of a slice establishment request by an APP is avoided. Therefore, there is no need to apply for a required APP ID or change an existing APP architecture.

When it is determined that there is a need to establish an NSL, for example, when an APP is a film and television APP, a dedicated NSL may need to be established for the transmission of video data, so as to ensure a viewing experience of a user and prevent video lags. In this case, in order to establish the NSL, the service server may initiate a slice establishment request. It may be understood that different NSLs may provide different network service capabilities. In order to enable a network resource provided by the established NSL to meet a data transmission requirement, the slice establishment request may include a service quality parameter, such as a quality of service (QoS) parameter. The service quality parameter is used for selecting a required NSL configuration parameter from a plurality of NSL configuration parameters preset in the 5G network.

It may be understood that the NSL provides a network resource for data transmission, and data transmission also requires the establishment of a corresponding data path. Therefore, a data path connecting the service server and the UE also needs to be established in the established NSL to perform data transmission between the UE and the service server. The service server may instruct the UE through the slice establishment request to initiate a data path establishment request for the service server based on the service quality parameter.

S402. UE acquires a first device trigger request.

After the service server initiates the slice establishment request, the slice establishment request may be transmitted to the 5G network for the 5G network to trigger the UE to establish an NSL. It may be understood that, in order to enable the 5G network to determine UE in need of establishing an NSL, the slice establishment request may include an ID of the UE, such as a generic public subscription identifier (GPSI) of the UE, which may be represented by a telephone number. The 5G network may convert the slice establishment request into a first device trigger request according to the ID of the UE, and transmit the first device trigger request to the UE corresponding to the ID of the UE. The first device trigger request includes a service quality parameter in the slice establishment request.

For example, in the system architecture shown in FIG. 3, after initiating a slice establishment request, the service server may transmit the slice establishment request to a slice management component, the slice establishment request including a GPSI of the UE and a QoS parameter. The slice management component is a functional component that may be deployed in the service server 102 or another server to manage related operations of the service server in initiating the establishment and closing of an NSL. After receiving the slice establishment request, the slice management component may forward the slice establishment request to the 5G NEF module. In order to find the UE in the 5G network, after receiving the request, the 5G NEF module first extracts the GPSI of the UE, and initiates a user ID conversion request to the 5G UDM module according to the ID, so that the 5G UDM module returns the ID of the UE in the 5G network, such as a subscription permanent identifier (SUPI).

The 5G NEF module may transmit a first device trigger request to the corresponding UE according to the SUPI. The request is forwarded to the UE by the 5G AMF module. After acquiring the first device trigger request, the UE may complete the establishment of the NSL and the data path according to the first device trigger request.

S403. The UE determines a corresponding slice configuration ID according to the service quality parameter.

After acquiring the first device trigger request, the UE may extract the service quality parameter therein, and determine, according to the service quality parameter, a corresponding slice configuration ID from a plurality of slice configuration IDs provided by NSL configuration information. The slice configuration ID is used for identifying a configuration parameter of an NSL supporting the service quality parameter, such as single network slice selection assistance information (S-NSSAI) corresponding to the NSL. The NSL configuration information is used for providing a plurality of sets of quality parameters. Each set of quality parameters corresponds to one slice configuration ID. For example, the NSL configuration information may be information acquired by the UE by subscribing to a 5G network.

For example, in the system architecture shown in FIG. 3, after acquiring the first device trigger request, the UE may extract the QoS parameter therein, and select S-NSSAI meeting the QoS parameter from NSL configuration information provided by UE subscription information.

S404. The UE initiates a data path establishment request for the service server according to the slice configuration ID.

After determining the slice configuration ID of the NSL that needs to be established, the UE may transmit the slice configuration ID to establish the corresponding NSL in the 5G network. Based on this, in order to implement the data transmission with the service server, the UE needs to establish a data path corresponding to the service server in the NSL. In this case, in order to establish the data path, the UE may initiate a data path establishment request for the service server to the 5G network according to the slice configuration ID, the data path establishment request including the slice configuration ID.

S405. The UE acquires an establishment complete message returned for the data path establishment request.

After receiving the data path establishment request transmitted by the UE, the 5G network may establish a corresponding target NSL according to the slice configuration ID therein. The target NSL is an NSL capable of supporting the service quality parameter in a plurality of NSLs that may be established through the 5G network. After establishing the target NSL, the 5G network may establish a data path for data transmission between the UE and the service server according to the data path establishment request. In order to enable the data path to share a network resource provided by the 5G network through the target NSL, after establishing the data path, the 5G network may import the data path into the established target NSL.

After completing importing, the 5G network may transmit an establishment complete message to the UE, the establishment complete message being used for identifying that the established data path has been imported into the established target NSL. The UE may acquire the establishment complete message returned for the data path establishment request, thereby learning that the required NSL and the data path have been established.

For example, in the system architecture shown in FIG. 3, the UE may transmit a data path establishment request to the 5G NSSF module. The request is first transmitted to the 5G AMF module and then forwarded to the 5G NSSF module by the 5G AMF module. The 5G NSSF module may complete the establishment of the NSL and the data path in the 5G RAN module and the 5G UPF module according to the request, and then return an establishment complete message to the UE. The establishment complete message is received by the UE after forwarded by the 5G AMF module.

S406. The UE returns a first device trigger response including an ID of the data path for the first device trigger request.

In order to enable the service server to use the data path for data transmission, after acquiring the establishment complete message, the UE needs to notify the service server of a message that the NSL and the data path are established. The UE may return a first device trigger response including an ID of the data path to the 5G network for the first device trigger request, the first device trigger response being used for identifying that the target NSL is established.

S407. The service server acquires a slice establishment response including the ID of the data path.

In order to enable the service server to receive and learn a message that the NSL is established, after receiving the first device trigger response transmitted by the UE, the 5G network may convert the first device trigger response into a slice establishment response that may be received and recognized by the service server and transmit the slice establishment response to the service server. The service server may receive the slice establishment response, the slice establishment response being used for identifying that the target NSL corresponding to the slice configuration ID is established, and the data path between the UE and the service server has been imported into the target NSL. In this case, the service server may perform data transmission with the UE through the data path using the network resource provided by the target NSL.

For example, in the system architecture shown in FIG. 3, after receiving the establishment complete message, the UE may transmit a first device trigger response to the 5G NEF module. The 5G NEF module may transmit a slice establishment response to the slice management component according to the response. The slice establishment response is transmitted to the service server by the slice management component to notify the service server that the target NSL is established.

It can be seen from the foregoing technical solution that the service server may actively initiate a slice establishment request in response to determining a service requirement for establishing an NSL, the slice establishment request including a service quality parameter supporting the service requirement. Correspondingly, the terminal may acquire a first device trigger request corresponding to the slice establishment request, and determine a corresponding slice configuration ID according to the service quality parameter in the first device trigger request, the slice configuration ID being capable of reflecting a configuration parameter of an NSL capable of supporting the service quality parameter. The terminal initiates a data path establishment request for the service server according to the slice configuration ID, the data path establishment request being capable of instructing the 5G network to establish a data path between the terminal and the service server in an established NSL supporting the service quality parameter. The terminal returns, in response to confirming that the data path is established, a first device trigger response including an ID of the data path so as to notify the service server that the NSL is established. It can be seen therefrom that, when there is a need to establish an NSL between the terminal and the service server, the service server may serve as an initiator of a slice establishment request. An APP deployed in the terminal only needs to make a request of establishing a corresponding data path after the service server initiates the request, without being architecturally upgraded to transmit dedicated network signaling so as to initiate the slice establishment request, and may be matched with the service server to implement the establishment of the NSL under an original APP system architecture so as to meet a service requirement in the 5G network. Moreover, there is no need to apply for a specific APP ID, so that the adaptation costs for accessing the 5G network are greatly reduced.

It may be understood that, since an APP corresponding to a service in the UE dominates service processing in most cases, the APP in the UE may determine whether the service processing needs the establishment of an NSL. In a possible implementation, the UE may transmit a service request including an ID of the UE, the service request being used for requesting the service server to initiate a slice establishment request. The service server may acquire the service request including the ID of the UE and initiate the slice establishment request according to the request.

For example, when there is a certain film and television APP in the UE, a user may want to watch a certain high-definition video through the APP. Since a high-definition video usually includes a large volume of video data, in order to ensure that the user can view the video fluently, the film and television APP may transmit a service request including the ID of the UE to a service server storing the video data, so that the service server initiates a slice establishment request for an NSL for transmitting the video data.

In addition, in the 5G network, in order to make full use of network resources provided by NSLs, a plurality of data paths may be imported into one NSL, each of the data paths being used for data transmission between a group of UE and the service server respectively. In this case, in order to distinguish data transmitted through the NSL to transmit the data between the corresponding service server and UE, in a possible implementation, address information of the service server may further be included in the slice establishment request initiated by the service server. After learning that the data path is established and imported into the target NSL, the UE may establish a URSP record corresponding to the slice configuration ID, the URSP record including a correspondence between the address information and the ID of the data path. The address information is used for identifying a position of the service server in a DN. There may be a plurality of types of address information. In a possible implementation, the address information may include a network address, port number, and network protocol number of the service server.

It may be understood that a plurality of data paths may be imported into each NSL, and each of the data paths corresponds to one URSP record. When the UE needs to perform data transmission after the URSP record is established according to the address information of the service server initiating this slice establishment request, in a possible implementation, in order to determine whether this data transmission is data transmission with the service server, the UE may first determine whether destination address information of a data message to be transmitted is consistent with the URSP record, the destination address information of the data message being used for identifying the service server that the UE is intended to transmit the data message to. In response to YES, it indicates that the data message is to be transmitted to the service server. In this case, the UE may transmit the data message to the service server through the data path imported into the target NSL.

For example, in the system architecture shown in FIG. 3, after acquiring the establishment complete message, the UE may extract the network address, port number, and network protocol number of the service server from the first device trigger request, and establish a URSP corresponding to the S-NSSAI in combination with the S-NSSAI. The URSP corresponds to an ID of a PDU session one to one. That is, there is a correspondence between the network address, port number, and network protocol number of the service server in the URSP and the ID of the PDU session. When transmitting the data message, the UE may determine whether a destination network address, destination port number, and destination network protocol number of the data message are consistent with the URSP, and in response to YES, transmits the data message to the service server through the PDU session.

It may be understood that data transmission is usually bidirectional. Therefore, in a possible implementation, in order to enable the service server to find a corresponding data path for data transmission with UE with a data transmission requirement, after acquiring the slice establishment response including the ID of the data path, the service server may establish a correspondence between the address information and the ID of the data path according to its own address information in the slice establishment request. When data transmission is needed, the service server can determine an ID of a corresponding data path according to its own address information and perform data transmission with corresponding UE through the data path. It may be understood that the ID of the data path may differ at the UE side and the service server side. For example, the ID of the data path at the UE side may be an ID of a PDU session, and the ID of the data path at the service server side may be a hypertext transport protocol (HTTP) ID.

In addition, in a related 5G network architecture, service servers are usually distributed in a DN. There may be a plurality of DNs, such as a local DN and a central DN. Different service servers may be distributed in different DNs. When data transmission is performed in a 5G network, it may be necessary to first determine a DN where a service server is distributed and then determine a specific distribution position of the service server in the DN according to address information. Therefore, in a possible implementation, when the first device trigger request is transmitted to the UE, a DN ID, such as a data network name (DNN), of a DN where the service server is located may be added to the first device trigger request. After receiving the request, the UE may initiate a data path establishment request for the service server according to the slice configuration ID and the DN ID so that the 5G network can establish a data path to the DN according to the establishment request. For example, in the schematic diagram shown in FIG. 3, the slice management component can acquire underlying information of the DN. When the service server 102 initiates the slice establishment request, the slice management component may acquire a DNN of the service server 102 and add the DNN to the slice establishment request for transmitting to the 5G NEF module together. The 5G network adds the DNN to the first device trigger request for transmitting to the UE 101.

The UE may transmit the data message to the DN where the service server is located through the data path. Then, the data message is transmitted to the corresponding service server through a related module, such as the 5G UPF module, according to the destination address information in the data message.

It may be understood that, after the data transmission ends, in order to save network resources, the NSL for this data transmission may be closed to release the network resource occupied by the NSL for other UE and service servers with data transmission requirements to establish NSLs. In a possible implementation, the service server may initiate a slice closing request including the ID of the data path, the slice closing request being used for instructing the UE to release the data path to close the target NSL. It may be understood that, in a possible implementation, the service server may perform an NSL closing operation through another functional component. For example, in the schematic diagram shown in FIG. 3, after initiating a slice closing request, the service server 102 may communicate with the 5G network through the slice management component to complete the NSL closing operation.

After receiving the slice closing request, the 5G network may convert the request into a second device trigger request that the UE can receive and respond to, and transmit the second device trigger request to the UE, the second device trigger request including the ID of the data path carried in the slice closing request initiated by the service server. After acquiring the second device trigger request, the UE may initiate a data path release request for the data path according to the ID of the data path in the request. After receiving the data path release request, the 5G network may release the data path and close the target NSL where the data path is located. Then, the 5G network may return a release complete message to the UE for the data path release request, the release complete message being used for identifying that the data path is released and the target NSL is closed.

After acquiring the release complete message, the UE may return a second device trigger response for the second device trigger request so as to notify the service server of a message that the slice is closed, the second device trigger response being used for identifying that the target NSL is closed. After receiving the second device trigger response, the 5G network may convert the second device trigger response into a slice closing response and transmit the slice closing response to the service server initiating the slice closing request, the slice closing response being used for identifying that the target NSL is closed.

In addition, since the data path is released after the NSL is closed, the URSP record established by the UE and corresponding to the slice configuration ID and the correspondence between the address information stored in the service server and the ID of the data path are invalid. In this case, in order to cleanse useless information in the UE and the service server and facilitate the initiation of the subsequent establishment of the NSL and the data path, in a possible implementation, in event that a URSP record corresponding to the NSL is established, the UE may delete the URSP record. In addition, in event that the correspondence is established in the service server, the correspondence may be deleted.

Figure 5:
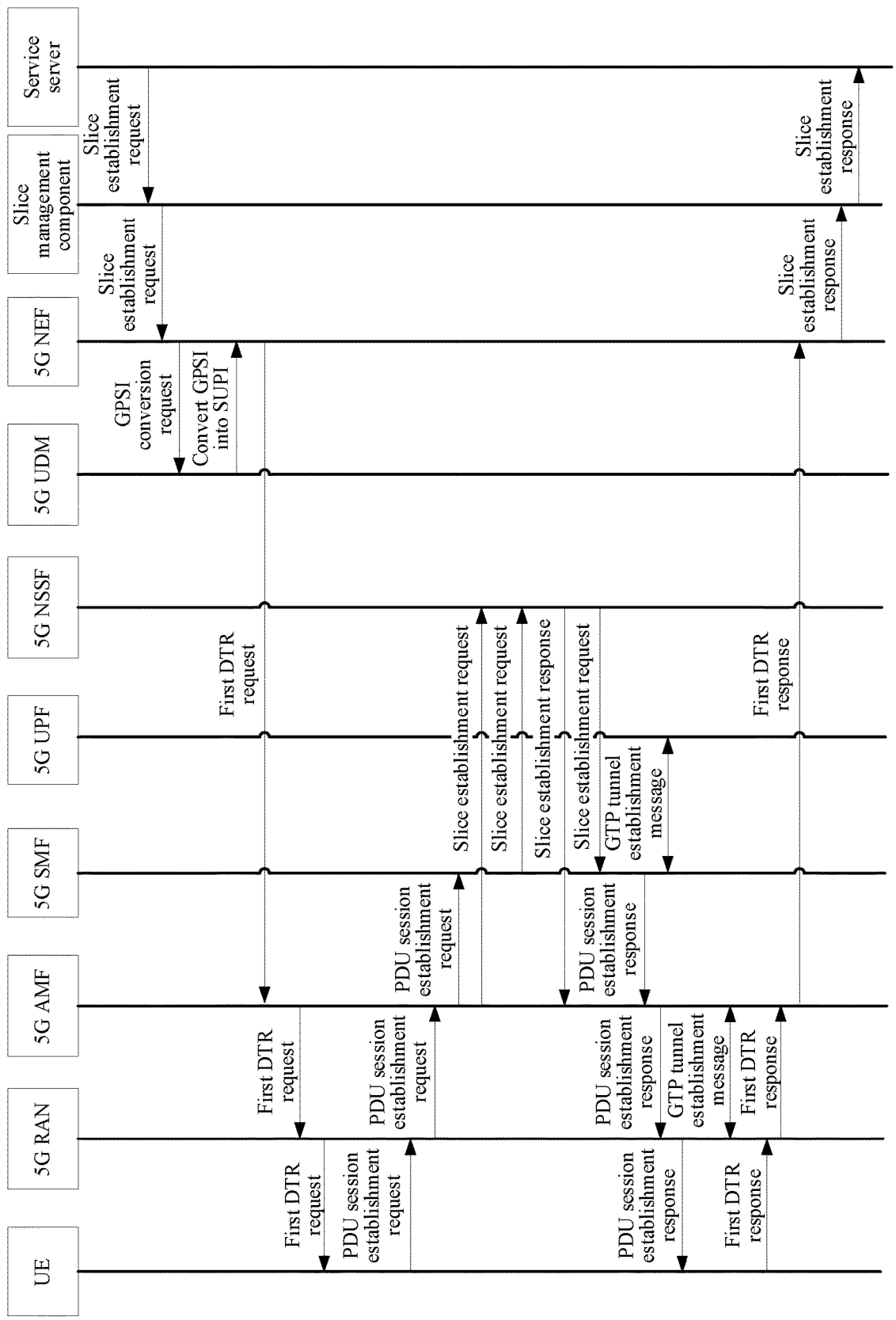
FIG. 5 is a schematic diagram of an NSL determination method in a practical application scenario according to an embodiment of this application.

The following describes a network slice determination method provided in an embodiment of this application with reference to a practical actual application scenario. As shown in FIG. 5, FIG. 5 is a schematic diagram of an NSL determination method in a practical application scenario according to an embodiment of this application. FIG. 5 mainly shows an NSL establishment flow in the practical application scenario.

In the practical application scenario, the UE is a mobile phone held by the user, and there is a network disk APP in the mobile phone. The APP determines that an NSL needs to be established for data transmission when the user downloads a certain large file through the network disk. In this case, the UE may transmit a service request including an ID of the mobile phone to the service server and add a GPSI of the mobile phone to the request. After receiving the request, the service server may determine whether to establish the NSL according to content of the service request. For example, the service server may determine whether a mobile phone corresponding to the GPSI has a qualification for data transmission through the NSL, the qualification being capable of indicating whether the user subscribes to a service for data transmission using an NSL.

After determining to establish the NSL, the service server transmits a slice establishment request to the slice management component, and writes the GPSI of the mobile phone, a network address, port number, and network protocol number of the service server, and a QoS parameter into the request. The slice management component may transmit the slice establishment request to the 5G NEF module. The 5G NEF module may extract the GPSI of the mobile phone therein and transmit a GPSI query request to the 5G UDM module according to the GPSI. The 5G UDM module may read the GPS I in the query request, and after finding a SUPI corresponding to the GPSI, may return the SUPI to the 5G NEF module.

After reading the returned SUPI, the 5G NEF module transmits a first data terminal ready (DTR) request to the 5G AMF module, and writes the SUPI of the mobile phone, the network address, port number, and network protocol number of the service server, a DNN corresponding to the service server, and the QoS parameter n into the request, noting that the request requires the mobile phone to initiate the establishment of a data path. The 5G AMF module may forward the first DTR request to the corresponding UE, i.e., the mobile phone, according to the SUPI in the first DTR request. After receiving the request, the mobile phone may read address information of the service server, the DNN, and the QoS parameter therein.

After reading the foregoing parameters, the mobile phone may search locally stored subscription information with a network operator for an NSL configuration meeting the QoS parameter, and extract corresponding S-NSSAI. Then, the mobile phone initiates a PDU session establishment request to the 5G RAN module according to the S-NSSAI, and writes the DNN and the S-NSSAI into the request.

The 5G AMF module first receives the request and then transmits the PDU session establishment request to the 5G SMF module. The 5G AMF module may transmit a slice establishment request to the 5G NSSF module, and write the S-NSSAI into the request. The 5G SMF module may also transmit a slice establishment request to the 5G NSSF module, and write the S-NSSAI into the request.

After a target NSL is established, the 5G AMF module notifies the 5G RAN module that a PDU session is established, and the 5G SMF module notifies the 5G UPF module that the PDU session is established. During the establishment of the data path, the 5G network may first establish a general packet radio service tunneling protocol (GTP) tunnel according to the DNN and a GTP, the GTP tunnel being established in the target NSL and used for transmitting data to a DN corresponding to the DNN. The PDU session is imported into the GTP tunnel after established, thereby completing a process of importing the PDU session into the target NSL.

Then, the 5G NSSF module confirms with the 5G AMF module and the 5G SMF module that the NSL is established, and returns an ID of the PDU session. The 5G AMF module confirms with the mobile phone that the PDU session is established. After receiving a PDU session establishment response, the mobile phone may establish a new URSP record, write the address information of the service server into the record, and establish a one-to-one correspondence between the address information and the ID of the PDU session. After completing the establishment, the mobile phone returns a first DTR response to the 5G NEF module to confirm that the PDU session is established, and writes the ID of the PDU session into the response.

The 5G NEF module may return a slice establishment response to the slice management component to confirm that the NSL is established, and write the ID of the PDU session into the response. The slice management component may forward the response to the service server to notify the service server that the NSL is established. The service server may establish a correspondence between its own address information and the ID of the PDU session for data transmission.

Figure 6:
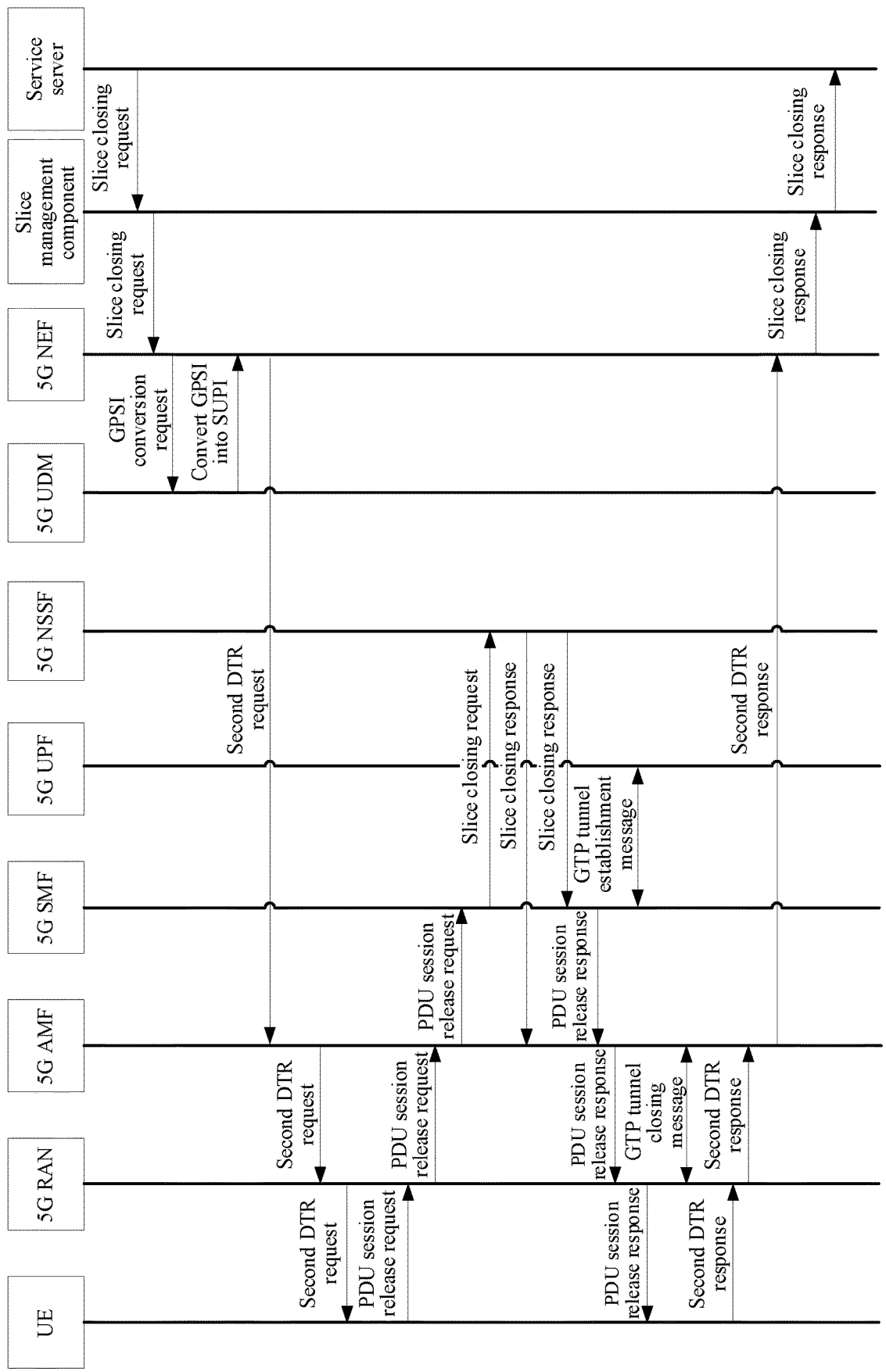
FIG. 6 is a schematic diagram of an NSL determination method in a practical application scenario according to an embodiment of this application.

In addition, an NSL closing method is also shown in the practical application scenario. Referring to FIG. 6, FIG. 6 mainly shows an NSL closing flow in the practical application scenario. In order to save network resources, after determining that the file transmission is completed, the network disk APP in the mobile phone determines to close the NSL established for this data transmission. In this case, the mobile phone may transmit a service request including the GPSI of the mobile phone to the service server. After receiving the service request, the service server determines to close the NSL, transmits a slice closing request to the slice management component, and writes the GPSI of the mobile phone and the address information of the service server into the request.

After receiving the slice closing request, the slice management component may determine an ID of a PDU session corresponding to the address information from stored information. Then, the slice management component may transmit a slice closing request to the 5G NEF module, and writes the GPSI of the mobile phone and the ID of the PDU session into the request. After receiving the request, the 5G NEF module may extract the GPSI therein, transmit a query request to the 5G UDM module, and acquire the SUPI of the mobile phone found by the 5G UDM module and corresponding to the GPSI.

The 5G NEF module may transmit a second DTR request to the 5G AMF module, and write the SUPI and the ID of the PDU session into the request, noting that the request requires the mobile phone to initiate a PDU session release request. The 5G AMF module may forward the request to the corresponding UE, i.e., the mobile phone, according to the SUPI. After receiving the second DTR request, the mobile phone may read the ID of the PDU session therein and then transmit a PDU session release request to the 5G AMF module through the 5G RAN module according to the ID. After receiving the request, the 5G AMF module may transmit a PDU session release request to the 5G SMF module and a slice closing request to the 5G NSSF module. The 5G SMF module may also transmit an NSL establishment request to the 5G NSSF module.

After the NSL is closed and the PDU session is released, the 5G AMF module notifies the 5G RAN module that the PDU session is released, and the 5G SMF module notifies the 5G UPF module that the PDU session is released. In addition, the 5G NSSF module confirms with the 5G AMF module and the 5G SMF module that the NSL is closed respectively. Then, the 5G AMF module returns a PDU session release response to the mobile phone to notify that the PDU session is released. After receiving the response, the mobile phone clears a corresponding URSP record and returns a second DTR response to the 5G NEF module to confirm that the NSL is closed.

The 5G NEF module may return a slice establishment response to the slice management component for the slice management component to forward to the service server to notify the service server that the NSL is closed. Finally, the service server deletes the stored correspondence between the ID of the PDU session and the address information for next NSL establishment.

Figure 7:
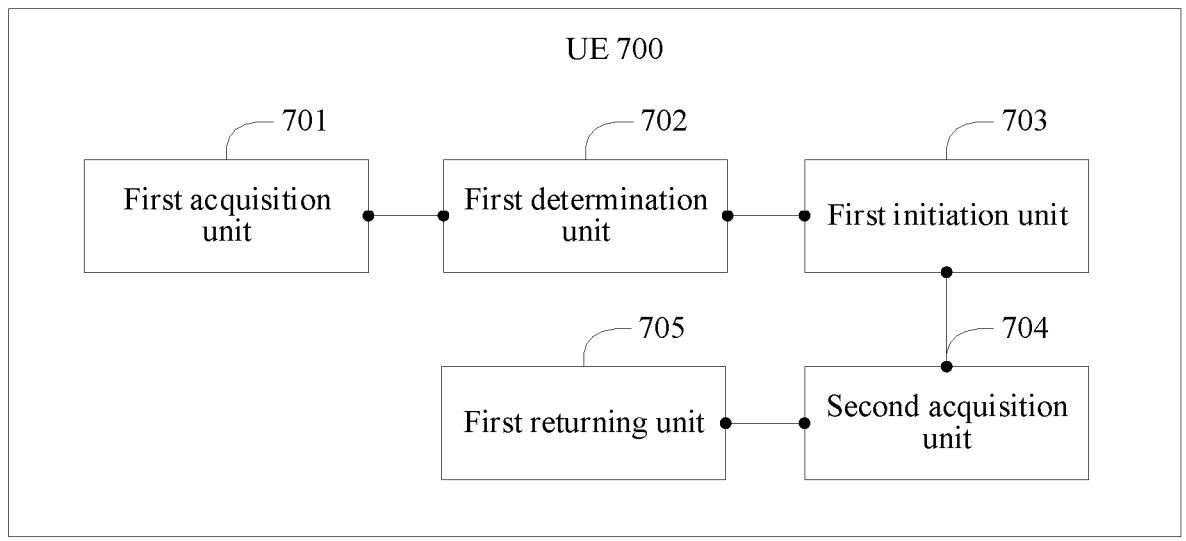
FIG. 7 is a structural block diagram of UE according to an embodiment of this application.

Based on the NSL determination methods provided in the foregoing embodiments, an embodiment of this application further provides UE 700. Referring to FIG. 7, the UE includes a first acquisition unit 701, a first determination unit 702, a first initiation unit 703, a second acquisition unit 704, and a first returning unit 705.

The first acquisition unit 701 is configured to acquire a first device trigger request, the first device trigger request including a service quality parameter carried in a slice establishment request initiated by a service server.

The first determination unit 702 is configured to determine a corresponding slice configuration ID according to the service quality parameter, the slice configuration ID being used for identifying a configuration parameter of an NSL supporting the service quality parameter.

The first initiation unit 703 is configured to initiate a data path establishment request for the service server according to the slice configuration ID.

The second acquisition unit 704 is configured to acquire an establishment complete message returned for the data path establishment request, the establishment complete message being used for identifying that an established data path has been imported into an established target NSL, and the target NSL being established according to the slice configuration ID.

The first returning unit 705 is configured to return a first device trigger response including an ID of the data path for the first device trigger request, the first device trigger response being used for identifying that the target NSL is established.

In a possible implementation, the first device trigger request further includes address information of the service server, and the UE 700 further includes an establishment unit 706.

The establishment unit 706 is configured to establish a URSP record corresponding to the slice configuration ID, the URSP record including a correspondence between the address information and the ID of the data path.

In a possible implementation, the UE 700 further includes a second determination unit 707.

The second determination unit 707 is configured to determine whether destination address information of a data message to be transmitted is consistent with the URSP record; and in response to YES, transmit the data message to the service server through the data path imported into the target NSL.

In a possible implementation, the address information includes a network address, port number, and network protocol number of the service server.

In a possible implementation, the first device trigger request further includes a DN ID of a DN where the service server is located. The first initiation unit 703 is specifically configured to:

initiate the data path establishment request for the service server according to the slice configuration ID and the DN ID.

In a possible implementation, the UE 700 further includes a transmission unit 708.

The transmission unit 708 is configured to transmit a service request including an ID of UE, the service request being used for requesting the service server to initiate the slice establishment request.

In a possible implementation, the UE 700 further includes a third acquisition unit 709, a second initiation unit 710, a fourth acquisition unit 711, and a second returning unit 712.

The third acquisition unit 709 is configured to acquire a second device trigger request, the second device trigger request including the ID of the data path carried in a slice closing request initiated by the service server.

The second initiation unit 710 is configured to initiate a data path release request for the data path according to the ID of the data path.

The fourth acquisition unit 711 is configured to acquire a release complete message returned for the data path release request, the release complete message being used for identifying that the data path is released and the target NSL is closed.

The second returning unit 712 is configured to return a second device trigger response for the second device trigger request, the second device trigger response being used for identifying that the target NSL is closed.

In a possible implementation, if the URSP record corresponding to the service server is established, the UE 700 further includes a deletion unit 713.

The deletion unit 713 is configured to delete the URSP record.

Figure 8:
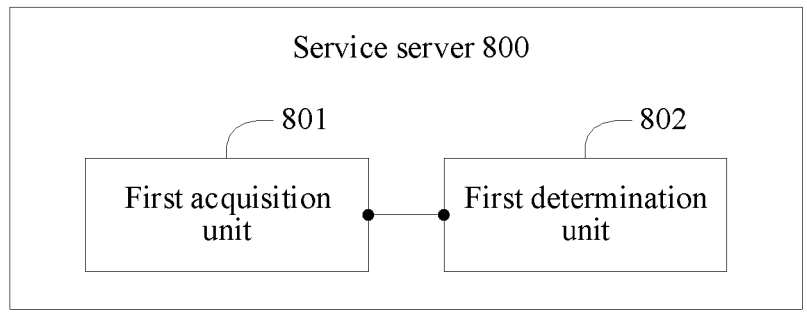
FIG. 8 is a structural block diagram of a service server according to an embodiment of this application.

Based on the NSL determination methods provided in the foregoing embodiments, an embodiment of this application further provides a service server 800. Referring to FIG. 8, the service server 800 includes a first initiation unit 801 and a first acquisition unit 802.

The first initiation unit 801 is configured to initiate a slice establishment request, the slice establishment request including a service quality parameter and an ID of UE, and the slice establishment request being used for instructing the UE to initiate a data path establishment request for the service server based on the service quality parameter.

The first acquisition unit 802 is configured to acquire a slice establishment response including an ID of a data path, the slice establishment response being used for identifying that a target NSL corresponding to a slice configuration ID is established, and the data path between the UE and the service server has been imported into the target NSL.

In a possible implementation, the slice establishment request further includes address information of the service server. The service server 800 further includes an establishment unit 803.

The establishing unit 803 is configured to establish a correspondence between the address information and the ID of the data path.

In a possible implementation, the service server 800 further includes a second acquisition unit 804.

The second acquisition unit 804 is configured to acquire a service request including the ID of the UE, the service request being used for requesting the service server to initiate the slice establishment request.

In a possible implementation, the service server 800 further includes a second initiation unit 805 and a third acquisition unit 806.

The second initiation unit 805 is configured to initiate a slice closing request including the ID of the data path, the slice closing request being used for instructing the UE to release the data path to close the target NSL.

The third acquisition unit 806 is configured to acquire a slice closing response, the slice closing response being used for identifying that the target NSL is closed.

In a possible implementation, if the correspondence is established, the service server 800 further includes a deletion unit 807.

The deletion unit 807 is configured to delete the correspondence.

Figure 9:
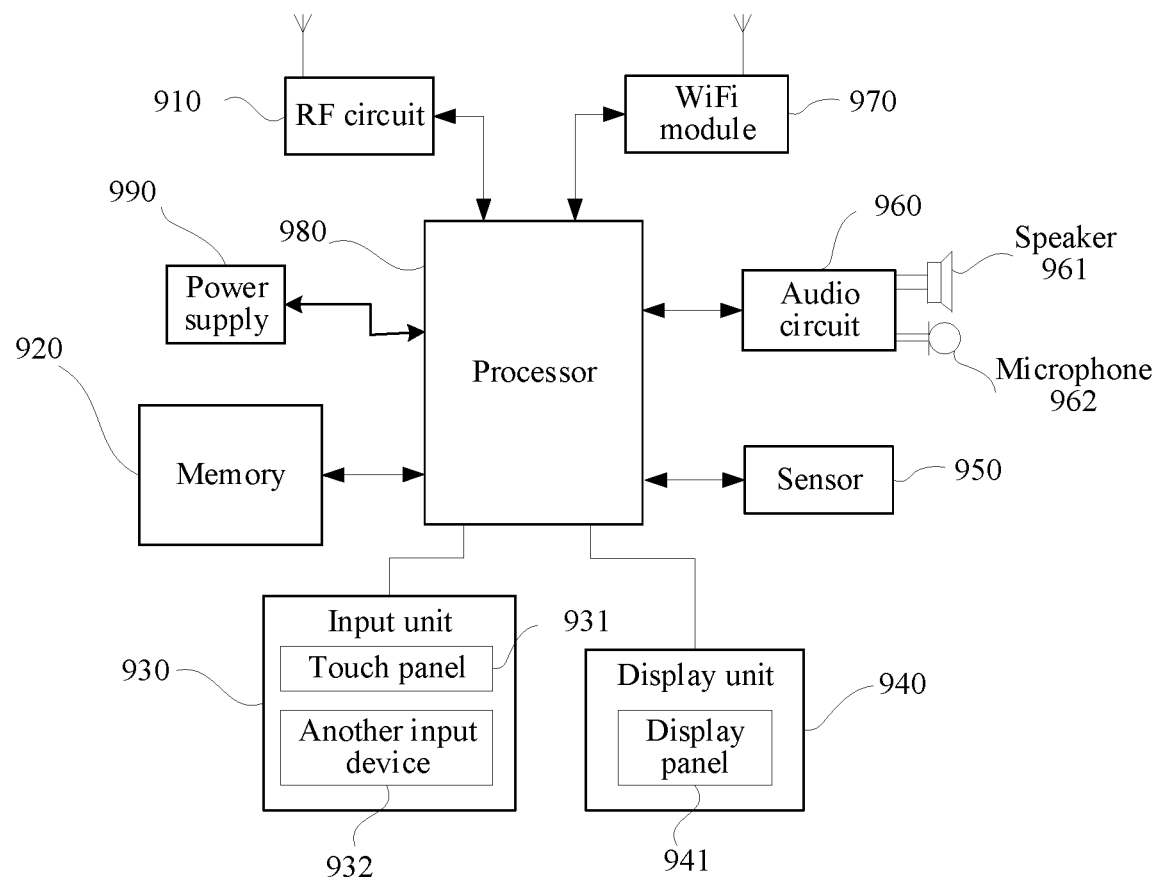
FIG. 9 is a structural diagram of an NSL determination device according to an embodiment of this application.

An embodiment of this application further provides a network slice determination device, and the following describes the device with reference to the accompanying drawings. Referring to FIG. 9, an embodiment of this application provides a device 900, and the device 900 may alternatively be a terminal device. The terminal device may be any smart terminal including a mobile phone, a tablet computer, a PDA, a point of sales (POS), or an on-board computer, and the terminal device being a mobile phone is used as an example.

FIG. 9 is a block diagram of a partial structure of a mobile phone related to a terminal device according to an embodiment of this application. Referring to FIG. 9, the mobile phone includes components such as a radio frequency (RF) circuit 910, a memory 920, an input unit 930, a display unit 940, a sensor 950, an audio circuit 960, a wireless fidelity (Wi-Fi) module 970, a processor 980, and a power supply 990. A person skilled in the art may understand that the structure of the mobile phone shown in FIG. 9 does not constitute a limitation on the mobile phone, and the mobile phone may include more or fewer components than those shown in the figure, or some components may be combined, or a different component deployment may be used.

The following describes the components of the mobile phone with reference to FIG. 9 in detail.

The RF circuit 910 may be configured to receive and transmit signals during an information receiving and transmission process or a call process. Specifically, the RF circuit 910 receives downlink information from a base station, then delivers the downlink information to the processor 980 for processing, and transmits designed uplink data to the base station. Generally, the RF circuit 910 includes, but is not limited to, an antenna, at least one amplifier, a transceiver, a coupler, a low noise amplifier (LNA), a duplexer, and the like. In addition, the RF circuit 910 may also communicate with a network and another device through wireless communication. The wireless communication may use any communication standard or protocol, including, but not limited to a global system for mobile communications (GSM), a general packet radio service (GPRS), code division multiple access (CDMA), wideband code division multiple access (WCDMA), long term evolution (LTE), an email, a short messaging service (SMS), and the like.

The memory 920 may be configured to store a software program and module. The processor 980 runs the software program and module stored in the memory 920, to implement various functional applications and data processing of the mobile phone. The memory 920 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 920 may include a high speed random access memory, and may further include a non-volatile memory, such as at least one magnetic disk storage device, a flash storage device, or other non-volatile solid state storage devices.

The input unit 930 may be configured to receive inputted digit or character information, and generate a keyboard signal input related to the user setting and function control of the mobile phone. Specifically, the input unit 930 may include a touch panel 931 and another input device 932. The touch panel 931, which may also be referred to as a touchscreen, may collect a touch operation of a user on or near the touch panel (such as an operation of a user on or near the touch panel 931 by using any suitable object or accessory such as a finger or a stylus), and drive a corresponding connection apparatus according to a preset program. Optionally, the touch panel 931 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 980. Moreover, the touch controller can receive and execute a command transmitted from the processor 1480. In addition, the touch panel 931 may be implemented by using various types, such as a resistive type, a capacitive type, an infrared type, and a surface acoustic wave type. In addition to the touch panel 931, the input unit 930 may further include the another input device 932. Specifically, the another input device 932 may include, but is not limited to, one or more of a physical keyboard, a functional key (for example, a volume control key or a switch key), a track ball, a mouse, and a joystick.

The display unit 940 may be configured to display information inputted by the user or information provided for the user, and various menus of the mobile phone. The display unit 940 may include a display panel 941. Optionally, the display panel 941 may be configured in the form of a liquid crystal display (LCD), an organic light-emitting diode (OLED), or the like. Further, the touch panel 931 may cover the display panel 941. After detecting a touch operation on or near the touch panel 931, the touch panel 731 transfers the touch operation to the processor 980, so as to determine a type of the touch event. Then, the processor 980 provides corresponding visual output on the display panel 941 according to the type of the touch event. Although in FIG. 9, the touch panel 931 and the display panel 941 are used as two separate parts to implement input and output functions of the mobile phone, in some embodiments, the touch panel 931 and the display panel 941 may be integrated to implement the input and output functions of the mobile phone.

The mobile phone may further include at least one sensor 950 such as an optical sensor, a motion sensor, and other sensors. Specifically, the optical sensor may include an ambient light sensor and a proximity sensor. The ambient light sensor may adjust luminance of the display panel 941 according to brightness of the ambient light. The proximity sensor may switch off the display panel 941 and/or backlight when the mobile phone is moved to the ear. As one type of motion sensor, an acceleration sensor can detect magnitude of accelerations in various directions (generally on three axes), may detect magnitude and a direction of the gravity when being static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 960, a speaker 961, and a microphone 962 may provide audio interfaces between a user and the mobile phone. The audio circuit 960 may convert received audio data into an electrical signal and transmit the electrical signal to the speaker 961. The speaker 961 converts the electrical signal into a sound signal for output. On the other hand, the microphone 962 converts a collected sound signal into an electrical signal. The audio circuit 960 receives the electrical signal, converts the electrical signal into audio data, and outputs the audio data to the processor 980 for processing. Then, the processor 980 transmits the audio data to, for example, another mobile phone by using the RF circuit 910, or outputs the audio data to the memory 920 for further processing.

Wi-Fi is a short distance wireless transmission technology. The mobile phone may help, by using the Wi-Fi module 970, a user to receive and transmit an email, browse a web page, access stream media, and the like. This provides wireless broadband Internet access for the user. Although FIG. 9 shows the Wi-Fi module 970, it may be understood that the Wi-Fi module is not a necessary component of the mobile phone, and the Wi-Fi module may be omitted as required provided that the scope of the essence of the present disclosure is not changed.

The processor 980 is the control center of the mobile phone, and is connected to various parts of the mobile phone by using various interfaces and lines. By running or executing the software program and/or module stored in the memory 920, and invoking data stored in the memory 920, the processor performs various functions and data processing of the mobile phone, thereby performing overall monitoring on the mobile phone. Optionally, the processor 980 may include one or more processing units. Preferably, an application processor and a modulation and demodulation processor may be integrated into the processor 980. The application processor mainly processes an operating system, a user interface, an application program, and the like, and the modulation and demodulation processor mainly processes wireless communication. It may be understood that the foregoing modem may either not be integrated into the processor 708.

The mobile phone further includes the power supply 990 (such as a battery) for supplying power to the components. Preferably, the power supply may be logically connected to the processor 980 by using a power management system, thereby implementing functions such as charging, discharging, and power consumption management by using the power management system.

Although not shown in the figure, the mobile phone may further include a camera, a Bluetooth module, and the like. Details are not described herein again.

In this embodiment, the processor 980 included in the terminal device further has the following functions:

acquiring a first device trigger request, the first device trigger request including a service quality parameter carried in a slice establishment request initiated by a service server;

determining a corresponding slice configuration ID according to the service quality parameter, the slice configuration ID being used for identifying a configuration parameter of an NSL supporting the service quality parameter;

initiating a data path establishment request for the service server according to the slice configuration ID;

acquiring an establishment complete message returned for the data path establishment request, the establishment complete message being used for identifying that an established data path has been imported into an established target NSL, and the target NSL being established according to the slice configuration ID; and returning a first device trigger response including an ID of the data path for the first device trigger request, the first device trigger response being used for identifying that the target NSL is established.

Alternatively, the processor 980 included in the terminal device further has the following functions:

initiating a slice establishment request, the slice establishment request including a service quality parameter and an ID of UE, and the slice establishment request being used for instructing the UE to initiate a data path establishment request for a service server based on the service quality parameter; and acquiring a slice establishment response including an ID of a data path, the slice establishment response being used for identifying that a target NSL corresponding to a slice configuration ID is established, and the data path between the UE and the service server has been imported into the target NSL.

Figure 10:
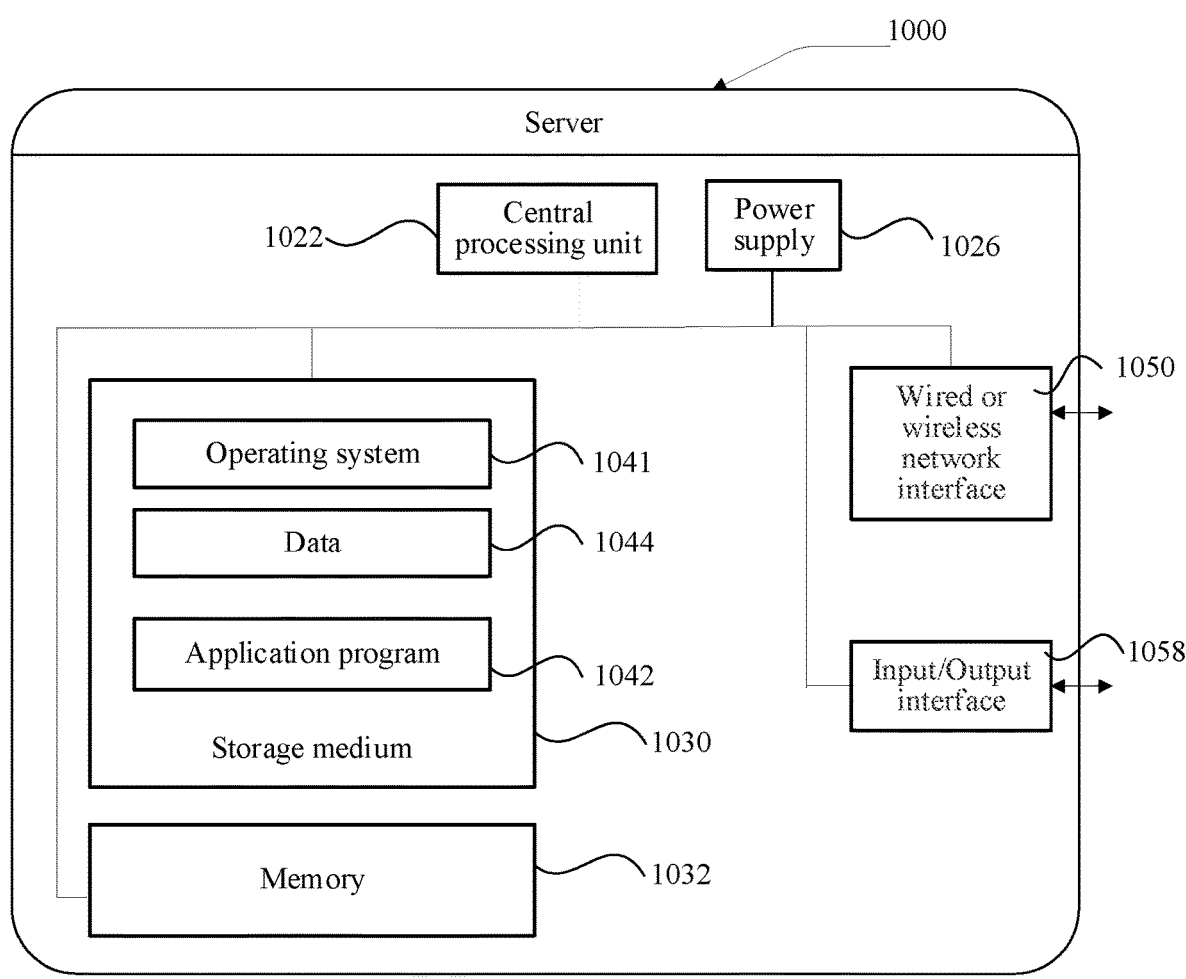
FIG. 10 is a structural diagram of a server according to an embodiment of this application.

An embodiment of this application further provides a server. FIG. 10 is a structural diagram of a server 1000 according to an embodiment of this application. The server 1000 may vary greatly due to different configurations or performance, and may include one or more central processing units (CPUs) 1022 (for example, one or more processors) and a memory 1032, and one or more storage media 1030 (for example, one or more mass storage devices) that store application programs 1042 or data 1044. The memory 1032 and the storage media 1030 may be transient storage or persistent storage. The program stored in the storage medium 1030 may include one or more modules (not shown in the figure), and each module may include a series of instruction operations on the server. Furthermore, the CPUs 1022 may be configured to be in communication with the storage media 1030 and to execute the series of instructions in the storage media 1030 on the server 1000.

The server 1000 may further include one or more power supplies 1026, one or more wired or wireless network interfaces 1050, one or more input/output interfaces 1058, and/or one or more operating systems 1041, such as Windows Server™, Mac OS X™, Unix™, Linux™, and FreeBSD™.

The steps performed by the server in the foregoing embodiments may be based on the server structure shown in FIG. 10.

An embodiment of this application further provides a computer-readable storage medium, configured to store a computer program, the computer program being configured to perform the network slice determination method described in the foregoing embodiments.

An embodiment of this application further provides an NSL determination system. The system includes UE and a service server. The UE and the service server in the system may be configured to perform the NSL determination method provided in the foregoing embodiments.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium may be at least one of the following media: any medium that can store program code, such as a read-only memory (ROM), a RAM, a magnetic disk, or an optical disc.

The embodiments in this specification are all described in a progressive manner, for same or similar parts in the embodiments, reference may be made to these embodiments, and each embodiment focuses on a difference from other embodiments. Especially, device and system embodiments are basically similar to the method embodiments, and therefore is described briefly; for related parts, reference may be made to partial descriptions in the method embodiments. The described device and system embodiments are merely exemplary. The units described as separate parts may or may not be physically separated, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments without creative efforts.

The foregoing descriptions are merely a specific implementation of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network slice (NSL) determination method, comprising:

acquiring, by a user equipment (UE), a plurality of slice configuration identifiers (IDs) provided by NSL configuration information when the UE subscribes to a network;

acquiring, by a user equipment (UE), a first device trigger request, the first device trigger request comprising a service quality parameter carried in a slice establishment request initiated by a service server;

extracting, by the UE, the service quality parameter carried in the slice establishment request;

determining, by the UE, a corresponding slice configuration identifier (ID) from among the plurality of slice configuration IDs provided by the NSL configuration information that corresponds to the service quality parameter carried in the slice establishment request, the slice configuration ID used to identify a configuration parameter of an NSL supporting the service quality parameter;

initiating, by the UE, a data path establishment request for the service server according to the corresponding slice configuration ID;

acquiring, by the UE, an establishment complete message returned for the data path establishment request, the establishment complete message used to identify that an established data path has been imported into an established target NSL, and the target NSL being established according to the corresponding slice configuration ID; and returning, by the UE, a first device trigger response comprising an ID of the data path for the first device trigger request, the first device trigger response used to identify that the target NSL is established.

2. The method according to claim 1, wherein the first device trigger request further comprises address information of the service server, and the method further comprises:

establishing a user equipment (UE) route selection policy (URSP) record corresponding to the slice configuration ID, the URSP record comprising a correspondence between the address information and the ID of the data path.

3. The method according to claim 2, further comprising:

in response to determining that destination address information of a data message to be transmitted is consistent with the URSP record, transmitting the data message to the service server through the data path imported into the target NSL.

4. The method according to claim 2, wherein the address information comprises a network address, a port number, and a network protocol number of the service server.

5. The method according to claim 1, wherein the first device trigger request further comprises a data network (DN) ID of a DN where the service server is located; and the initiating comprises:
   initiating the data path establishment request for the service server according to the slice configuration ID and the DN ID.

6. The method according to claim 1, further comprising:
   before acquiring the first trigger request, transmitting a service request comprising an ID of UE, the service request used to request the service server to initiate the slice establishment request.

7. The method according to claim 1, further comprising:
   acquiring a second device trigger request, the second device trigger request comprising the ID of the data path carried in a slice closing request initiated by the service server;
   initiating a data path release request for the data path according to the ID of the data path;
   acquiring a release complete message returned for the data path release request, the release complete message used to identify that the data path is released and the target NSL is closed; and
   returning a second device trigger response for the second device trigger request, the second device trigger response used to identify that the target NSL is closed.

8. An apparatus configured as a user equipment (UE), the apparatus comprising:
   a memory storing a plurality of instructions; and
   a processor configured to execute the plurality of instructions, and upon execution of the plurality of instructions, is configured to:
      acquire a plurality of slice configuration identifiers (IDs) provided by network slice (NSL) configuration information when the apparatus, configured as the UE, subscribes to a network;
      acquire a first device trigger request, the first device trigger request comprising a service quality parameter carried in a slice establishment request initiated by a service server;
      extract the service quality parameter carried in the slice establishment request;
      determine a corresponding slice configuration identifier (ID) from among the plurality of slice configuration IDs provided by the NSL configuration information that corresponds to the service quality parameter carried in the slice establishment request, the slice configuration ID used to identify a configuration parameter of a network slice (NSL) supporting the service quality parameter;
      initiate a data path establishment request for the service server according to the corresponding slice configuration ID;
      acquire an establishment complete message returned for the data path establishment request, the establishment complete message used to identify that an established data path has been imported into an established target NSL, and the target NSL being established according to the corresponding slice configuration ID; and
      return a first device trigger response comprising an ID of the data path for the first device trigger request, the first device trigger response used to identify that the target NSL is established.

9. The apparatus according to claim 8, wherein the first device trigger request further comprises address information of the service server, and wherein the processor, upon execution of the plurality of instructions, is further configured to:
   establish a user equipment (UE) route selection policy (URSP) record corresponding to the slice configuration ID, the URSP record comprising a correspondence between the address information and the ID of the data path.

10. The apparatus according to claim 9, wherein the processor, upon execution of the plurality of instructions, is further configured to:
    in response to determination that destination address information of a data message to be transmitted is consistent with the URSP record, transmit the data message to the service server through the data path imported into the target NSL.

11. The apparatus according to claim 8, wherein the address information comprises a network address, a port number, and a network protocol number of the service server.

12. The apparatus according to claim 8, wherein the first device trigger request further comprises a data network (DN) ID of a DN where the service server is located; and
    wherein in order to initiate the data path establishment request for the service server according to the slice configuration ID, the processor, upon execution of the plurality of instructions, is configured to:
       initiate the data path establishment request for the service server according to the slice configuration ID and the DN ID.

13. The apparatus according to claim 8, wherein the process, upon execution of the plurality of instructions, is further configured to:
    before acquiring the first trigger request, transmit a service request comprising an ID of UE, the service request used to request the service server to initiate the slice establishment request.

14. The apparatus according to claim 8, wherein the processor, upon execution of the plurality of instructions, is further configured to:
    acquire a second device trigger request, the second device trigger request comprising the ID of the data path carried in a slice closing request initiated by the service server;
    initiate a data path release request for the data path according to the ID of the data path;
    acquire a release complete message returned for the data path release request, the release complete message used to identify that the data path is released and the target NSL is closed; and
    return a second device trigger response for the second device trigger request, the second device trigger response used to identify that the target NSL is closed.

15. A non-transitory computer-readable medium storing computer-readable instructions, wherein, the computer-readable instructions, when executed by a processor in a user equipment (UE), are configured to cause the UE to perform:
    acquiring a plurality of slice configuration identifiers (IDs) provided by network slice (NSL) configuration information when the UE subscribes to a network;
    acquiring a first device trigger request, the first device trigger request comprising a service quality parameter carried in a slice establishment request initiated by a service server;
    extracting the service quality parameter carried in the slice establishment request;

determining a corresponding slice configuration identifier (ID) from among the plurality of slice configuration IDs provided by the NSL configuration information that corresponds to the service quality parameter carried in the slice establishment request, the slice configuration ID used to identify a configuration parameter of an NSL supporting the service quality parameter;

initiating a data path establishment request for the service server according to the corresponding slice configuration ID;

acquiring an establishment complete message returned for the data path establishment request, the establishment complete message used to identify that an established data path has been imported into an established target NSL, and the target NSL being established according to the corresponding slice configuration ID; and returning a first device trigger response comprising an ID of the data path for the first device trigger request, the first device trigger response used to identify that the target NSL is established.

16. The non-transitory computer-readable medium according to claim 15, wherein:
the first device trigger request further comprises address information of the service server, and
the computer-readable instructions, when executed by the processor in the UE, are configured to further cause the UE to perform:
establishing a user equipment (UE) route selection policy (URSP) record corresponding to the slice configuration ID, the URSP record comprising a correspondence between the address information and the ID of the data path.

17. The non-transitory computer-readable medium according to claim 16, wherein the computer-readable instructions, when executed by the processor in the UE, are configured to further cause the UE to perform:
in response to determining that destination address information of a data message to be transmitted is consistent with the URSP record, transmitting the data message to the service server through the data path imported into the target NSL.

18. The non-transitory computer-readable medium according to claim 16, wherein the address information comprises a network address, a port number, and a network protocol number of the service server.

19. The non-transitory computer-readable medium according to claim 15, wherein the first device trigger request further comprises a data network (DN) ID of a DN where the service server is located; and the initiating comprises:
initiating the data path establishment request for the service server according to the slice configuration ID and the DN ID.

20. The non-transitory computer-readable medium according to claim 15, wherein, the computer-readable instructions, when executed by the processor in the UE, are configured to further cause the UE to perform:
before acquiring the first trigger request, transmitting a service request comprising an ID of UE, the service request used to request the service server to initiate the slice establishment request.

* * * * *